US008386843B2

(12) United States Patent
Learmonth

(10) Patent No.: US 8,386,843 B2
(45) Date of Patent: Feb. 26, 2013

(54) HIGH SPEED REDUNDANT DATA PROCESSING SYSTEM

(75) Inventor: Darren Stewart Learmonth, Gilwern (GB)

(73) Assignee: Cassidian Limited, Newport (GB)

( * ) Notice: Subject to any disclaimer, the term of this patent is extended or adjusted under 35 U.S.C. 154(b) by 297 days.

(21) Appl. No.: 12/223,843

(22) PCT Filed: Dec. 15, 2006

(86) PCT No.: PCT/GB2006/004720
§ 371 (c)(1),
(2), (4) Date: Aug. 19, 2010

(87) PCT Pub. No.: WO2007/091005
PCT Pub. Date: Aug. 16, 2007

(65) Prior Publication Data
US 2010/0318851 A1    Dec. 16, 2010

(30) Foreign Application Priority Data

Feb. 9, 2006 (GB) .................................. 0602641.3

(51) Int. Cl.
*G06F 11/00* (2006.01)
(52) U.S. Cl. ................. 714/11; 714/10; 714/12; 714/31; 714/37
(58) Field of Classification Search ............ 714/31, 714/10–12, 37
See application file for complete search history.

(56) References Cited

U.S. PATENT DOCUMENTS

| | | | | |
|---|---|---|---|---|
| 4,096,990 A | * | 6/1978 | Strelow | 714/11 |
| 4,358,823 A | * | 11/1982 | McDonald et al. | 714/11 |
| 4,400,792 A | | 8/1983 | Strelow | |
| 5,086,429 A | * | 2/1992 | Gray et al. | 714/13 |
| 5,134,618 A | * | 7/1992 | Matt et al. | 714/757 |
| 5,226,152 A | * | 7/1993 | Klug et al. | 714/12 |
| 5,243,607 A | * | 9/1993 | Masson et al. | 714/49 |

(Continued)

FOREIGN PATENT DOCUMENTS

| | | |
|---|---|---|
| DE | 19529434 | 2/1997 |
| EP | 0156388 | 10/1985 |

(Continued)

OTHER PUBLICATIONS

International Search Report dated May 31, 2007 in related PCT Application Serial No. PCT/GB2006/004720.

(Continued)

*Primary Examiner* — Loan L. T. Truong
(74) *Attorney, Agent, or Firm* — Stout, Uxa, Buyan & Mullins; Carlos A. Fisher

(57) ABSTRACT

A high speed data processing system is described comprising first and second data processing modules and first and second data checking modules. The first and second data processing modules are each arranged to perform substantially the same processing steps on data received at said data input, with each providing an output. The first and second checking modules are arranged to compare the outputs of said first and second data processing modules and to output an error signal indicative of whether or not said first and second data processing modules have performed substantially the same processing steps. The first and second checking modules are located on physically separate devices. In some arrangements a third checking module is provided, which checking module may be physically separated from each of said first and second checking modules.

19 Claims, 3 Drawing Sheets

U.S. PATENT DOCUMENTS

| | | | |
|---|---|---|---|
| 5,640,508 A * | 6/1997 | Fujiwara et al. | 714/30 |
| 5,758,058 A * | 5/1998 | Milburn | 714/11 |
| 5,848,238 A | 12/1998 | Shimomura et al. | |
| 5,923,512 A * | 7/1999 | Brownlow et al. | 361/78 |
| 6,201,997 B1 | 3/2001 | Giers | |
| 6,247,118 B1 | 6/2001 | Zumkehr et al. | |
| 6,601,210 B1 * | 7/2003 | Kagan | 714/758 |
| 6,909,923 B2 * | 6/2005 | Vasko et al. | 700/79 |
| 6,985,975 B1 * | 1/2006 | Chamdani et al. | 710/55 |
| 7,213,168 B2 * | 5/2007 | Kalan et al. | 714/11 |
| 7,350,026 B2 * | 3/2008 | Popescu et al. | 711/119 |
| 7,617,412 B2 * | 11/2009 | Shelvik et al. | 714/12 |
| 2001/0044912 A1 | 11/2001 | Francis et al. | |
| 2003/0018936 A1 * | 1/2003 | Ryan et al. | 714/723 |
| 2003/0137940 A1 * | 7/2003 | Schwartz et al. | 370/235 |
| 2003/0182594 A1 * | 9/2003 | Watkins et al. | 714/11 |
| 2004/0193735 A1 | 9/2004 | Peleska et al. | |
| 2005/0060606 A1 * | 3/2005 | Kalan et al. | 714/12 |
| 2005/0229035 A1 | 10/2005 | Peleska et al. | |
| 2006/0095821 A1 * | 5/2006 | Mukherjee et al. | 714/736 |
| 2006/0101309 A1 * | 5/2006 | Mohiuddin et al. | 714/33 |

FOREIGN PATENT DOCUMENTS

| | | |
|---|---|---|
| EP | 0286856 | 10/1988 |
| EP | 1398699 | 3/2004 |
| GB | 1412177 | 10/1975 |
| GB | 2265737 | 10/1993 |
| JP | 62-006263 B2 | 2/1987 |
| JP | 02-301836 A | 12/1990 |
| JP | 07-129426 A | 5/1995 |
| JP | 07-160521 A | 6/1995 |
| JP | 07-281915 A | 10/1995 |
| JP | 11-510925 A | 9/1999 |
| JP | 3247043 B2 | 1/2002 |
| WO | WO 2004/034172 | 4/2004 |

OTHER PUBLICATIONS

UK Search Report dated Apr. 24, 2006 in related UK Application No. GB0602641.3.

R.J. Peterson, "Radiation-induced Errors in Memory Chips", *Brazilian Journal of Physics*, vol. 33, No. 2, pp. 246-249, Jun. 2003.

"Cryptography", *Wikipedia*, http://en.wikipedia.org/wiki/Cryptooraphy, Dec. 12, 2005.

"Advanced Encryption Standard", *Wikipedia*, http://en.wikipedia.org/wiki/AES, Dec. 12, 2005.

"Integrated Services Digital Network", *Wikipedia*, http://en.wikipedia.org/wiki/_Integrated_Services_Digital_Network, Dec. 12, 2005.

"Packet switching", *Wikipedia*, http://en.wikipedia.orq/wiki/Packet_switching, Dec. 12, 2005.

"Packet", *Wikipedia*, http://en.wikipedia.org/wiki/Packet, Dec. 12, 2005.

"Error correction and detection", *Wikipedia*, http://en.wikipedia.org/wiki/Error-correcting_code, Dec. 12, 2005.

"Cyclic redundancy check", *Wikipedia*, http://en.wikipedia.org/wiki/Cyclic_redundancy_check, Dec. 12, 2005.

"Understanding Soft and Firm Errors in Semiconductor Devices, Questions and Answers" *Actel*, http://www.actel.com/documents/SER_FAQ.pdf, Dec. 2002.

H.J. Lohmann, "Sicherheit von Mikrocomputern für die Eisenbahnsignaltechnik", Elektronische Rechenanlagen, vol. 22, No. 5, Oct. 1980, Munich, FRG, XP-000718854.

English Translation of the above referenced by H.J. Lohmann.

International Preliminary Report on Patentability and Written Opinion dated Aug. 12, 2008 in related PCT Application No. PCT/GB2006/ 004720.

European Patent Office Summons dated Jun. 5, 2009 in related EP Patent Application No. 06831395.6.

Australian Patent Office Examiner's First Report dated Apr. 15, 2011 in related Australian Patent Application No. 2006337907.

Australian Patent Office Examiner's Report No. 2 dated Feb. 24, 2012 in related Australian Patent Application No. 2006337907.

Intellectual Property Office of New Zealand Examination Report dated Jan. 13, 2010 in related New Zealand Patent Application No. 570745.

Intellectual Property Office of New Zealand Examination Report dated Feb. 23, 2011 in related New Zealand Patent Application No. 570745.

Intellectual Property Office of Singapore Written Opinion dated Aug. 5, 2009 in related Singapore Patent Application No. 200805875-2.

Australian Examination Report dated May 11, 2010 in related Singapore Patent Application No. 200805875-2.

* cited by examiner

| Input | | Output |
|---|---|---|
| 11100101 | 01 | 10110000 |
| 01101100 | 01 | 00111001 |
| 11111001 | 10 | 11011101 |
| 10001010 | 11 | 01110101 |
| 11010010 | 00 | 11010010 |

Figure 3

| A | B | A' | B' | $E_1$ | A" | B" | $E_2$ | DATA | ERROR |
|---|---|---|---|---|---|---|---|---|---|
| 1 | 1 | X | X | X | X | X | X | X | X |
| 1 | 1 | 1 | 1 | 0 | X | X | X | X | X |
| 1 | 1 | 1 | 1 | 0 | 1 | 1 | 0 | X | X |
| 0 | 0 | 1 | 1 | 0 | 1 | 1 | 0 | 1 | 0 |
| 1 | 0 | 0 | 0 | 0 | 1 | 1 | 0 | 1 | 0 |
| 0 | 0 | 1 | 0 | 1 | 0 | 0 | 0 | 1 | 0 |
| 1 | 1 | 0 | 0 | 0 | 1 | 0 | 1 | 0 | 0 |
| 0 | 0 | 1 | 1 | 0 | 0 | 0 | 0 | X | 1 |

Figure 4

HIGH SPEED REDUNDANT DATA PROCESSING SYSTEM

This invention relates systems and methods of data processing, in particular to data processing systems operating at high speeds, with high levels of accuracy.

Two of the key issues for any data processing system are the speed and accuracy of the data processing. Many arrangements for increasing accuracy have been proposed; however, such arrangements often require additional processing steps, which either decrease the speed of operation, increase the cost of implementation, or both. Accordingly, in some data processing systems speed, accuracy and cost are conflicting requirements that need to be balanced according to the requirements of the data processing system.

Many methods for increasing accuracy make use of redundancy. For example, a particular function can be implemented three times using three functionally identical circuits operating in parallel, with the output being accepted if at least two out of the three circuits give the same output. Such an arrangement has the attraction of simplicity, but the use of three (or more) circuits in parallel may be deemed unduly wasteful in some circumstances.

Other arrangements for increasing accuracy make use of error correction codes. Such an arrangement has the advantage of being able to correct some errors, rather than simply identifying errors, but the overhead in terms of data, and the data processing requirements, can be expensive to implement, and can adversely affect the data processing speed.

Data processing circuitry is prone to many forms of errors. One particularly problematic form of error is radiation-induced errors, which are sometimes referred to as "soft errors" or "single event upsets". Radiation-induced errors are caused by charged particles, such as radioactive particles (e.g. alpha particles), or particles caused by high energy cosmic rays or solar particles, causing ionization of the semiconductor of a memory device. If the collected charge is large enough, then the perceived state of a particular memory cell can be incorrect. Radiation-induced errors tend to be random in nature and can be difficult to detect.

The present invention seeks to overcome or mitigate some of the problems outlined above, or to provide alternative solutions to those currently available.

The present invention provides a data processing system comprising a data input, first and second data processing modules, and first and second data checking modules, wherein:
said first and second data processing modules are each arranged to perform substantially the same processing steps on data received at said data input;
said first and second checking modules are arranged to compare the outputs of said first and second data processing modules and to output an error signal indicative of whether or not said first and second data processing modules have performed substantially the same processing steps on said data received at said data input; and
said first and second checking modules are located on physically separate devices.

The present invention also provides a method of data processing comprising the steps of:
passing a data input to both first and second data processing modules;
arranging for said first and second data processing modules to perform substantially the same processing on said data input; and
arranging for first and second checking modules to output an error signal indicative of whether or not said first and second data processing modules have performed substantially the same processing steps on said data input, wherein said first and second checking modules are located on physically separate devices.

In one form of the invention, the checking modules are logic circuits that determine whether or not the outputs of the first and second processing modules are the same (indicating that no error has occurred) or different (indicating that an error has occurred). In one form of the invention, the output of one of the data processing circuits is inverted so that the checking modules determine whether or not the outputs of the first and second processing modules are the same (indicating that an error has occurred) or different (indicating that no error has occurred).

The present invention provides data processing duplication, thereby introducing redundancy to detect errors. Further, since the data processing steps are carried out in parallel, without any error checking algorithms during the processing, the data processing speed can be high. Further, by providing the data checking modules on physically separate devices, the probability of a radiation-induced error being undetected is reduced.

In one form of the invention, the first and second checking modules are provided on separate integrated circuits that are located on the same circuit board. However, the checking modules could be provided on different circuit boards, or indeed, further apart, particularly if use was made of wireless communications systems to pass data for checking to those checking modules. In all such arrangements, the devices are to be regarded as being physically separate. An advantage of physically separating the checking modules is to reduce the likelihood of radiation-induced errors occurring in both checking modules in the same manner. It is highly unlikely that identical errors will occur in two physically separated devices.

The said first and second data processing modules may be located on physically separated devices. The first and second data processing modules could be provided on separate integrated circuits that are located on the same circuit board. However, as described above with reference to checking modules, the first and second data processing modules could be provided on different circuit boards, or indeed, further apart. In one exemplary embodiment of the invention, the first and second data processing modules are implemented in separate field programmable gate arrays (FPGAs) that, in use, are located on the same circuit board.

The first data processing module and the first checking module may be located at the same physical location, for example, they may be implemented using the same FPGA. Alternatively, the first data processing module and the first checking module may be implemented on different integrated circuits; those integrated circuits may be placed close together, which has a number of advantages, including simpler wiring, which tends to increase the speed of operation.

The second data processing module and the second checking module may be located at the same physical location, for example, they may be implemented using the same FPGA. Alternatively, the second data processing module and the second checking module may be implemented on different integrated circuits; those integrated circuits may be placed close together, which has a number of advantages, including simpler wiring, which tends to increase the speed of operation.

In one form of the invention, the first data processing module and the first checking module are implemented on a first integrated circuit and the second data processing module and the second checking module are implemented on a second integrated circuit.

In one form of the invention, the outputs of said first and second data processing modules are passed to said first checking module, with the first checking module outputting both said error signal and said outputs of said first and second data processing modules to said second checking module. Thus, in this form of the invention, the outputs of the data processing modules are first checked by the first checking module, with the outputs of the first checking module being checked by the second checking module. In one arrangement of the invention, the first checking module has first and second inputs and said second checking module has first, second and third inputs, wherein: said first and second inputs of said first checking module receive the outputs of said first and second data processing modules respectively; said first checking module outputs first and second data signals corresponding to said outputs of said first and second data processing modules respectively and a first error signal indicative of whether or not said first and second data processing modules have performed substantially the same processing steps on said data received at said data input; said first and second inputs of said second checking module receive said first and second data signals from said first checking module and said third input of said second checking module receives said first error signal from said first checking module.

In one form of the invention, a third checking module is provided, the third checking module being arranged to compare the outputs of said first and second data processing modules and to output a signal indicative of whether or not said first and second data processing modules have performed substantially the same processing steps on said data input. The third checking module may be physically separated from one or both of the first and second checking modules. The third checking module may be physically separated from one or both of the first and second data processing modules. In one exemplary form of the invention, the first data processing module and first checking module are implemented on a first integrated circuit, the second data processing module and the second checking module are implemented on a second integrated circuit and the third checking module is implemented on a third integrated circuit; each of those integrated circuit may be provided on the same circuit board, or may be further separated, as discussed above.

In one form of the invention, the outputs of said first and second data processing modules are passed to said first checking module, with the first checking module outputting both said error signal and said outputs of said first and second data processing modules to said second checking module, and the second checking module outputting both said error signal and said outputs of said first and second data processing module to said third checking module. Thus, in this form of the invention, the outputs of the data processing modules are checked by the first, second and third checking modules in turn. In such an arrangement, the error output of a checking module may be set when either that module detects a mismatch between the outputs of said first and second data processing modules, or when the error output of the previous checking module is set.

At least one of said signals indicative of whether or not said first and second data processing modules have performed substantially the same processing steps on said data received at said data input may be provided as an input to at least one of said first and second data processing modules. In one form of the invention, the error output of the third checking module is provided as an input to the first checking module. The error signal that is fed back to the first processing module can be used to indicate that the results of a particular data processing step should be discarded. Alternatively, the signal that is fed back to the first processing module can be used to indicate that the results of a particular data processing step should be repeated.

In one form of the invention, an error output flag is provided, wherein said error output flag is set when any of said checking modules outputs a signal indicating that the outputs of said first and second data processing modules are not the same. The error flag may be set whenever any of the checking modules detects an error, without waiting for the error signal to propagate through to the output. The error flag may be provided as an input to one or more of the data processing modules, for example for use in discarding the results of a particular processing step, or for use in initiating the repeating of a particular data processing step.

The said data input may be a serial data input.

The functionality of each of said first and second data processing modules may be defined by data stored in one or more memory modules. A single memory device may be provided, which is used by both said first and second data processing modules; however, it is preferred that the functionality of said first data processing module is defined by data stored in a first memory module and the functionality of said second data processing module is defined by data stored in a second memory module, since this avoids potential problems due to more than one data processing module attempting to access the same memory location of the same memory module. Further, if only one memory module were provided, then if that memory module was not functioning correctly, then both data processing modules could operate in the same way on the basis of incorrect instructions and provide identical, incorrect outputs that would not be detected by any of the data checking modules.

In one form of the invention, the data input includes a code referencing a memory location in said memory module(s) defining the functionality of said data processing modules. For example, the data input may be a data packet, the packet including header information including the said code. Thus, the processing steps carried out may be different for different packets, as defined by the said code.

The present invention works well with packet-based data processing, although it is not limited to such uses. As is well known in the art, packet switching is used in many data communication systems and is currently the dominant switching technology used in the Internet. Packet switching works by routing individual packets of data between data nodes over data links that might be shared by many other nodes. Packet switching involves breaking a data file into much smaller packets of data, with each packet including additional information, such as the origin and destination of the file, and the position of the data included in the packet within the file. When the packets are received at the destination, the original file is reassembled.

Devices and methods in accordance with the invention will now be described, by way of example only, with reference to the accompanying schematic drawings in which:

FIG. 3 is a table demonstrating part of the functionality of the circuit of FIG. 1; and FIG. 4 is a table demonstrating another part of the functionality of the circuit of FIG. 1.

FIG. 1 is a block diagram of a processing system, indicated generally by the reference numeral 2, in accordance with an embodiment of the present invention.

Figure 1:
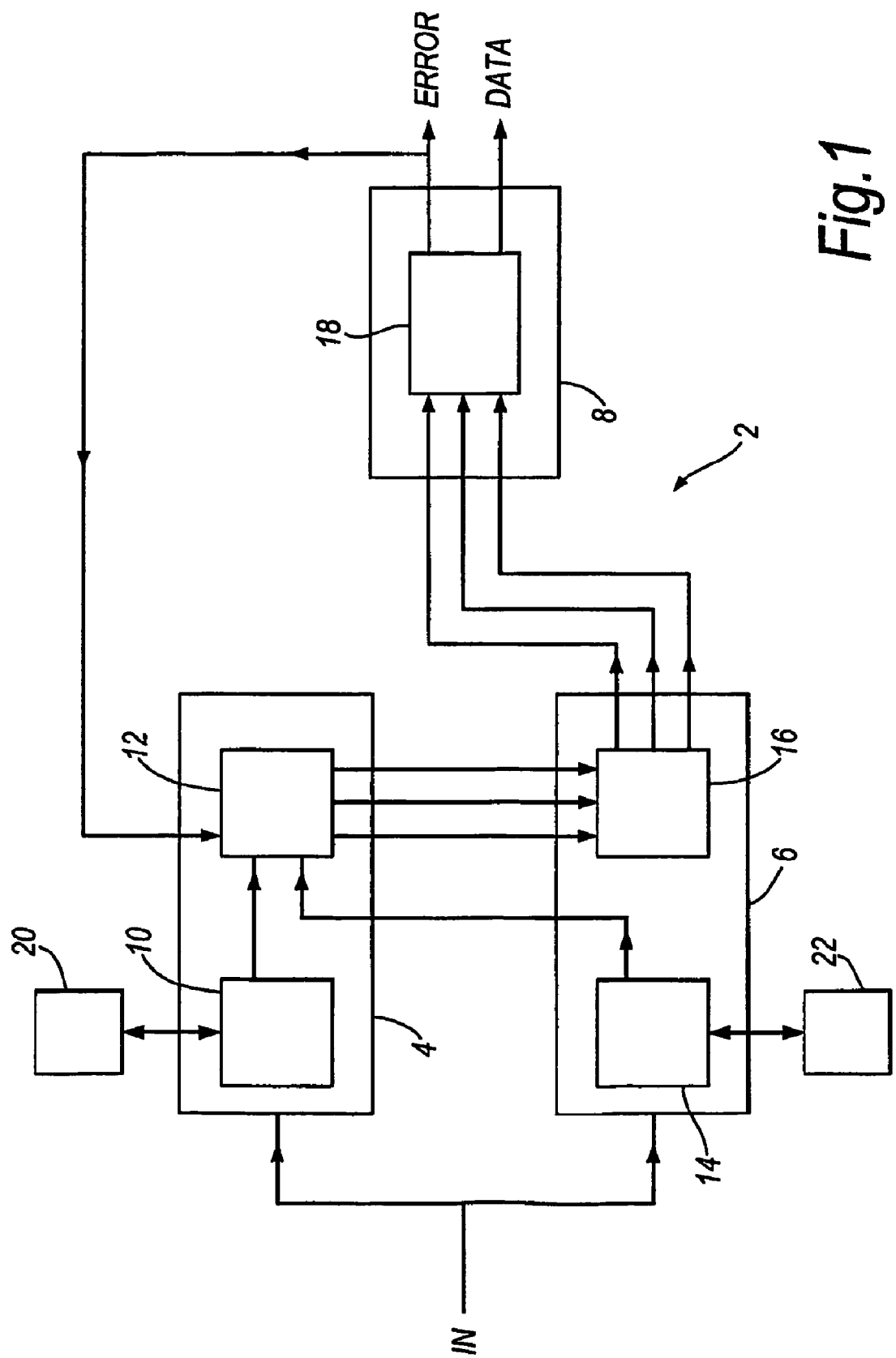
FIG. 1 is a block diagram of an embodiment of the present invention.

The processing system 2 comprises first 4, second 6, and third 8 data processing blocks. The first data processing block 4 comprises a first data processing module 10 and a first checking module 12. The second data processing block 6 comprises a second data processing module 14 and a second checking module 16. The third data processing module 8 comprises a third checking module 18. The first data processing module 10 is coupled to a memory device 20: the second data processing module 14 is coupled to a memory device 22.

The processing system 2 receives a data input IN from an external source. The data input IN is a data packet, that packet including information regarding the processing required to be performed on the data within the packet. The processing information is in the form of a code that references instructions in the memory devices 20 and 22. The first 10 and second 14 data processing modules each receive the data input IN, from which they extract the processing information. The first processing module 10 uses the processing information to obtain instructions from the memory device 20 regarding the processing steps to perform on the data input IN. Similarly, the second processing module 14 uses the processing information to obtain instructions from the memory device 22 regarding the processing steps to perform on the data input IN.

Thus, the first 10 and second 14 data processing modules use the memory devices 20 and 22 respectively as look up tables, with the processing code received from the data input IN being used to reference the data stored by the look up tables. The memory devices 20 and 22 may, for example, be implemented using any suitably sized fast-access RAM; the skilled person will be aware of many suitable devices. The first 10 and second 14 data processing modules then carry out processing steps on the incoming data on the basis of the instructions received from the memory modules 20 and 22. The processing modules 10 and 14 are intended to implement the same functions; accordingly, the outputs of the first and second processing modules should be the same.

The outputs of the first 10 and second 14 data processing modules are passed to the first checking module 12. As noted above, the data processing modules 10 and 14 are intended to perform the same operation (as defined by the memory modules 20 and 22) on the data input IN and should therefore provide the same data outputs. In one form of the invention, the first checking module compares each bit of the output of the first data processing module 10 with the corresponding bit of the output of the second data processing module 12, outputting an error signal if any corresponding outputs of the first and second processing modules differ. In one particular embodiment of the invention, the output of the second data processing module 14 is inverted prior to being passed to the first checking module 12; the first checking module 12 then outputs an error signal in the event that any corresponding outputs of the first and second data processing modules are the same.

There are a number of types of errors that might occur in the data processing system 2 that should be detected by the checking modules. For example, one of the memory devices 20 and 22 may include an error and the corresponding data processing module may implement an incorrect function as a result or one of the data processing modules 10 and 14 may include a physical defect of some kind.

The first checking module 12 has three outputs: the first and second outputs are simply the inputs to that checking module (i.e. they are simply the outputs of the first and second processing modules 12 and 14 respectively), with the third output being the error output described above.

The three outputs of the first checking module 12 form the three inputs of the second checking module 16. Thus, the second checking module 16 receives the outputs of the first and second processing modules 10 and 14. The second checking module proceeds to carry out the same checking function as the first checking module 12 and outputs an error signal in the event that a mismatch is detected. In addition, the error output of the second checking module 16 is also set if an error signal is output by the first checking module 12.

The second checking module 16 therefore provides three output signals: the first and second outputs are the outputs of the first 10 and second 14 processing modules respectively and the third output is the error signal. Those three outputs are provided as the inputs to the third checking module 18, which checking module has the same functionality as the second checking module.

The third checking module 18 outputs an error signal ERROR indicative of whether or not an error has been detected by any of the three checking modules, together with a data output DATA that represents the data input as modified by the data function being implemented by the processing system 2. The error signal ERROR is provided as an input to the first data checking module 12, which enables the processing of a particular packet to be discarded as soon as an error is detected. In one form of the invention, the checking module 12 is arranged to instruct the data processing modules 10 and 14 to repeat a data processing step when an error is detected. In other forms of the invention, the data packet in which a processing error is detected is simply discarded.

In one form of the invention, when any one of the checking modules detects an error, an error flag is set and passed to the next error checking module. When any of the error checking modules receives an error flag, the error output ERROR is immediately set and the data currently being processed is rejected. Thus, the detection of an error can quickly be used to reject the data being processed; it is not necessary to wait for the completion of the data processing step to determine that an error has occurred. In this manner, the throughput of the data processing system can be increased by not continuing to process data that is going to be rejected on the grounds that an error has been detected.

Figure 2:
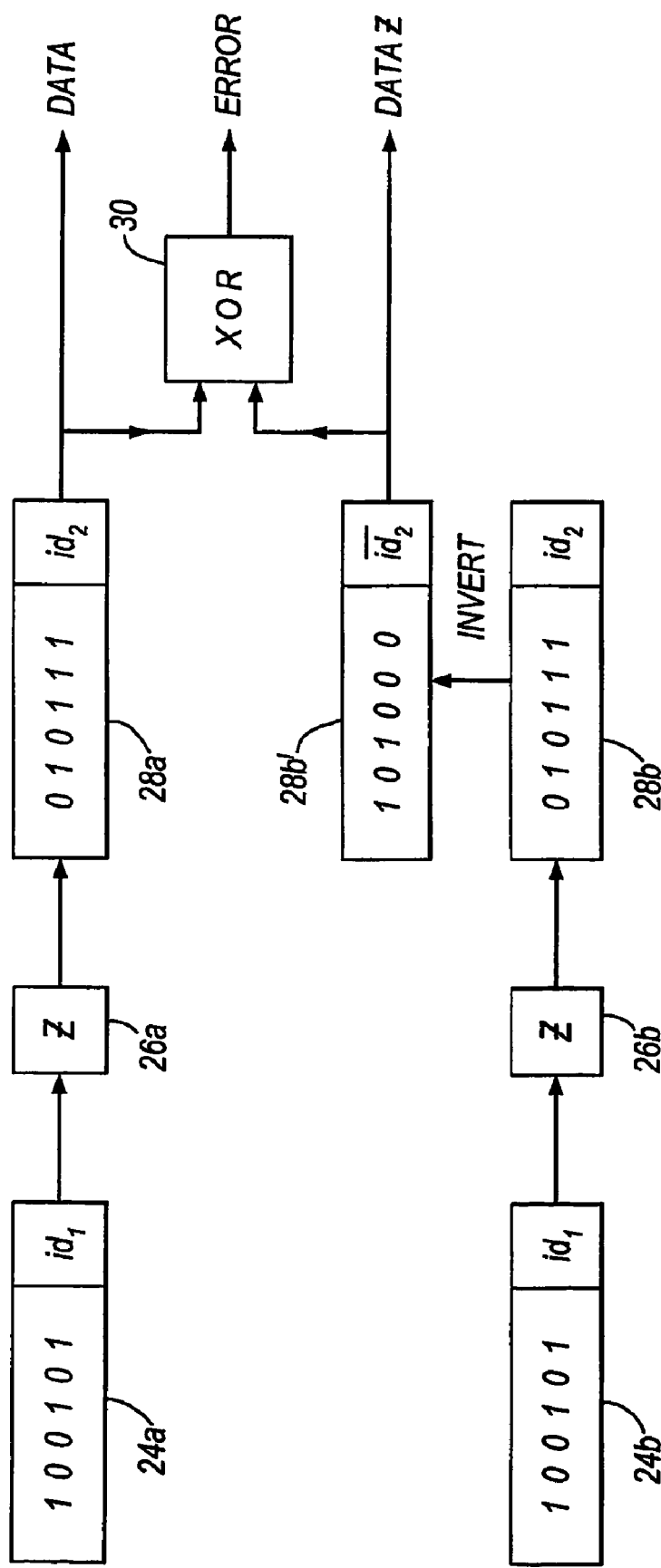
FIG. 2 is a schematic representation of the functionality of part of the circuit of FIG. 1.

FIG. 2 is a schematic representation of the functionality of part of the circuit of FIG. 1. FIG. 2 shows a data packet 24a being received at the input of a function block 26a, with the function block 26a outputting a data packet 28a. In parallel, a data packet 24b is received at the input of a function block 26b, with the function block 26b outputting a data packet 28b. The data packet 28b is then inverted to provide a data packet 28b'.

The data packets 24a and 24b are the data input IN of the processing system 2 described above and include a code $id_1$ identifying the functionality required to be implemented by the function blocks 26a and 26b. The function blocks 26a and 26b implement a function Z and are the data processing modules 10 and 14 respectively of the processing system 2. The data packets 28a and 28b are the outputs of the processing modules 10 and 14, with the data packet 28b' simply being an inverted version of the data packet 28b. The data packets 28a and 28b include a modified code $id_2$.

Each bit of the data packet 28a is compared, in series, with the corresponding bit of data packet 28b' by XOR gate 30. The data packets 28a and 28b should be identical, and each bit of data packet 28a should therefore be different to the corresponding bit of data packet 28b'. Thus, by presenting corresponding bits of the data packets 28 and 28b' at the inputs of an XOR gate, the output of the XOR gate should always be 1. Accordingly, if the output of the XOR gate 30 is zero at any stage, then an error has occurred and an error flag is set. The XOR gate 30 therefore implements the error checking circuit 12.

The arrangement of FIG. 2 provides a data output packet DATA, an inverted data output packet DATAZ and an error flag ERROR.

As described above, radiation-induced errors are a particularly problematic source of errors in data processing systems. A problem with such errors is that they can result in an error being undetected. Consider the following scenario:

The register 28a should contain the data word "010111" (as shown in FIG. 2) but in fact, due to an error in the function block 26a, the register 28a contains the data word "010110" (i.e. the final bit is incorrect).

The register 28b correctly contains the data word "010111", and the register 28b' stores the data word "101000". Thus, the XOR gate 30 should compare the output of the register 28a (010110) and the output of the register 28b' (101000) and detect an error.

However, due to a radiation-induced error, the XOR gate in fact reads the output of the register 28b' as "101001" (the final bit of which is read as a "1" instead of a "0") and does not detect the error in the output of the function block 26a.

The circuit of FIG. 1 provides three checking modules, rather than the one module shown in FIG. 2. In the exemplary scenario described above, even if the first checking module 12 did not detect the error due to a radiation-induced error, then the checking modules 16 and 18 would still be available to carry out the check. It is extremely unlikely that all three checking modules would be affected by a radiation-induced error in the same way.

In order to provide additional security, the checking modules 12, 16 and 18 are physically separated. Thus, even if there is a high level of alpha particles (or any other particles likely to cause radiation-induced errors) in the vicinity of one of the checking modules, the chances that all three checking modules will be similarly affected is further reduced.

In one implementation of the invention, the physically separated checking modules 12, 16 and 18 are implemented by different field-programmable gate arrays (FPGAs) that are placed on the same printed circuit board. However, the checking modules could be further separated, for example by placing the checking modules on different printed circuit boards. Indeed, by making use of remote communications technology, the checking modules could be separated by a large distance, in an extreme example, the three checking modules could be in different countries.

There now follows a trivial example demonstrating an exemplary use of the functioning of the processing system 2.

As noted above, the processing system 2 is well adapted for use with data packets including a code (hereinafter referred to as a state) defining the functionality of the processing modules 10 and 14. In the present example, the processing system 2 is used to process data packets including a 2-bit state. The functionality of the processing modules 10 and 14 in each state is as follows:

| State | Function |
|---|---|
| 00 | Input unchanged |
| 01 | Every second input bit is inverted |
| 10 | Every third input bit is inverted |
| 11 | All inputs are inverted |

The data input IN is a serial data input, with the state information being presented first. Accordingly, the state information can be extracted by the processing modules 10 and 14 and used to obtain the required information regarding the function required to be executed by those modules, which information is stored in the memory modules 20 and 22.

FIG. 3 is a table showing how the algorithm defined above works with some exemplary data inputs. The table shows a number of 10-bit data inputs, each 10-bit input including a 2-bit state. The 8 remaining bits of the 10-bit input are processed according to the algorithm described above, and the output generated is given in the table.

In the first and second lines of the table of FIG. 3, the state 01 is received indicating that every second bit of the inputs should be inverted by the processing system 2. Thus, in the first line, the input 11100101 becomes 10110000 and, in the second line, the input 01101100 becomes 00111001.

In the third line of the table of FIG. 3, the state 10 is received, indicating that every third bit of the input should be inverted. Thus, the input 11111001 becomes 11011101.

In the fourth line of the table of FIG. 3, the state 11 is received indicating that each bit of the input should be inverted. Thus, the input 10001010 becomes 01110101.

In the fifth line of the table of FIG. 3, the state 00 is receiving, indicating that the input should be unchanged. Thus, the input 11010010 is the same as the output.

There now follows a simple example showing the possible flow of data through the circuit of FIG. 1. In the example described below, the outputs of the first and second data processing modules 10 and 14 are referred to as A and B respectively. On the next clock cycle, the first checking module 12 outputs the data inputs A and B as A' and B' and outputs an error signal $E_1$, with the signals A', B' and $E_1$ forming the inputs of the second checking module 16. On the next clock cycle, the second checking module 16 outputs the data inputs A' and B' as A" and B" and outputs an error signal $E_2$, with the signals A", B" and $E_2$ forming the inputs of the third checking module 18. On the next clock cycle, the third checking module 18 outputs a DATA output, which is derived from the data inputs A" and B" and outputs an ERROR output.

Consider the following scenario, in which the outputs of the first and second data processing modules 10 and 14 are intended to be the data word 01010111. In this example, the first data processing module 10 operates correctly, but the second data processing module incorrectly outputs the data word 01000111.

The data flow through the circuit of FIG. 1 in this example is described below with reference to the table of FIG. 4, which table lists the data values A, B, A', B', $E_1$, A", B", $E_2$, DATA and ERROR for each of a number of clock cycles.

The data words are output by the first and second data processing modules 10 and 14 in series, with the least significant bits being output first. Thus, at the first clock cycle, the data bits A and B are both 1. The other data bits are unknown, and are listed as X in FIG. 4.

On the next data cycle, the previous values of A and B (both 1) are output as A' and B', and the error signal 0 (indicating there is no error) is output as $E_1$. The next incoming data bits (both 1) are the new inputs A and B. Again, the remaining data signal values are unknown.

On the next data cycle, the previous signals A', B' and $E_1$ become A", B" and $E_2$, the previous signals A and B become A' and B', with a new error signal (again 0) being set at $E_1$. The next data bits (again both 1) are presented as A and B.

On the next data cycle, the DATA output is set to be the previous values A" and B", the error signal is set to be 0 (no error detected), the previous signals A', B' and $E_1$ become A", B" and $E_2$, the previous signals A and B become A' and B', with a new error signal (again 0) being set at $E_1$. The next data bits (this time both 0) are presented as A and B.

On the next data cycle, the DATA output is set to be the previous values A" and B", the error signal is set to be 0 (no error detected), the previous signals A', B' and $E_1$ become A", B" and $E_2$, the previous signals A and B become A' and B', with a new error signal (again 0) being set at $E_1$. The next data bits (1 and 0 respectively) are presented as A and B.

On the next data cycle, the DATA output is set to be the previous values A" and B", the error signal is set to be 0 (no error detected), the previous signals A', B' and $E_1$ become A", B" and $E_2$, the previous signals A and B become A' and B'. This time, however, an error is detected, since the values A and B were different, and the error signal $E_1$ is set at 1. The next data bits (both 0) are presented as A and B.

On the next data cycle, the DATA output is set to be the previous values A" and B", the error signal is set to be 0 (no error detect), the previous signals A', B' and $E_1$ become A", B" and $E_2$ ($E_2$ now indicating an error), the previous signals A and B become A' and B' and the next data bits (both 1) are presented as A and B.

On the next data cycle, the error signal $E_2$ propagates to the error output ERROR. The data output is unspecified (X), since there was a conflict between the data values A" and B". Thus, the error originally detected by the first checking module 12 has propagated to the output.

It should be noted that in some forms of the invention, the error output could be used as an interrupt signal that is immediately passed to the output ERROR, rather than having to propagate through the entire circuit, as described above.

The processing system 2 of the present invention has many potential applications. For example, the data processing modules 10 and 14 could be programmed to detect particular patterns of data and to output a flag whenever a particular pattern is detected. In such an application, the state of the incoming data packets could be used to reference the particular data pattern(s) being searched. Further, many cryptographic algorithms carry out relatively simple functions on packets of data; the data processing system 2 would be well suited to carry out such functions.

The invention claimed is:

1. A data processing system comprising a data input, first and second data processing modules, and first and second data checking modules, wherein:
    said first and second data processing modules are each arranged to perform substantially the same processing steps on data received at said data input, with each providing an output;
    said first and second checking modules are arranged to compare the outputs of said first and second data processing modules and to output an error signal indicative of whether or not said first and second data processing modules have performed substantially the same processing steps on said data received at said data input;
    said first and second checking modules are located on physically separate devices;
    said first checking module has first and second inputs and said second checking module has first, second and third inputs;
    said first and second inputs of said first checking module receive the outputs of said first and second data processing modules respectively;
    said first checking module outputs first and second data signals corresponding to said outputs of said first and second data processing modules respectively and a first error signal indicative of whether or not said first and second data processing modules have performed substantially the same processing steps on said data received at said data input; and
    said first and second inputs of said second checking module receive said first and second data signals from said first checking module and said third input of said second checking module receives said first error signal from said first checking module.

2. A data processing system as claimed in claim 1, wherein said first and second data processing modules are located on physically separated devices.

3. A data processing system as claimed in claim 1, further comprising a third checking module arranged to compare the outputs of said first and second data processing modules and to output a signal indicative of whether or not said first and second data processing modules have performed substantially the same processing steps on said data received at said data input.

4. A data processing system as claimed in claim 3, wherein said third checking module has first, second and third inputs, wherein:
    said second checking module outputs third and fourth data signals corresponding to said outputs of said first and second data processing modules respectively and a second error signal indicative of whether or not said first and second data processing modules have performed substantially the same processing steps on said data received at said data input; and
    said first and second inputs of said third checking module receive said third and fourth data signals from said second checking module and said third input of said third checking module receives said second error signal from said second checking module.

5. A data processing system as claimed in claim 3, wherein the third checking module is physically separated from each of said first and second checking modules.

6. A data processing system as claimed in claim 3, wherein said signal indicative of whether or not said first and second data processing modules have performed substantially the same processing steps on said data received at said data input output by said third checking module is provided as an input to said first checking module.

7. A data processing system as claimed in claim 1, wherein said signal indicative of whether or not said first and second data processing modules have performed substantially the same processing steps on said data received at said data input is provided as an input to at least one of said first and second data processing modules.

8. A data processing system as claimed in claim 1, further comprising an error output flag, wherein said error output flag is set when any of said checking modules outputs a signal indicating that the first and second data processing modules have not performed substantially the same processing steps on said data received at said data input.

9. A data processing system as claimed in claim 1, wherein the functionality of each of said first and second processing modules is defined by data stored in one or more memory modules.

10. A data processing system as claimed in claim 9, wherein the functionality of said first processing module is defined by data stored in a first memory module and the functionality of said second processing module is defined by data stored in a second memory module.

11. A data processing system as claimed in claim 9, wherein the data received at said data input contains a code referencing a memory location in said one or more memory modules defining the functionality of said data processing modules.

12. A method of data processing comprising the steps of:
passing a data input to both first and second data processing modules;
arranging for said first and second data processing modules to perform substantially the same processing on said data input;
arranging for first and second checking modules to output an error signal indicative of whether or not said first and second data processing modules have performed substantially the same processing steps on said data input;
passing outputs of both said first and second data processing modules to said first checking module; and
passing said outputs of said first and second data processing modules from said first checking module to said second checking module, together with a first error signal indicative of whether or not said first and second data processing modules have performed substantially the same processing steps on said data received at said data input,
wherein said first and second checking modules are located on physically separate devices.

13. A method as claimed in claim 12, wherein said first and second data processing modules are located on physically separated devices.

14. A method as claimed in claim 12, further comprising the step of passing the outputs of both said first and second data processing modules to a third checking module, wherein said third checking module is arranged to output an error signal indicative of whether or not said first and second data processing modules have performed substantially the same processing steps on said data input.

15. A method as claimed in claim 14, further comprising the step of:
passing said outputs of said first and second data processing modules from said second checking module to said third checking module, together with a second error signal indicative of whether or not said first and second data processing modules have performed substantially the same processing steps on said data received at said data input.

16. A method as claimed in claim 14, wherein the third checking module is physically separated from each of said first and second checking modules.

17. A method as claimed in claim 14, further comprising the step of providing said signal indicative of whether or not said first and second data processing modules have performed substantially the same processing steps on said data received at said data input output by said third checking module as an input to said first checking module.

18. A method as claimed in claim 12, further comprising the step of providing at least one of said signals indicative of whether or not said first and second data processing modules have performed substantially the same processing steps on said data received at said data input as an input to at least one of said first and second data processing modules.

19. A method as claimed in claim 12, wherein said data input includes a code referencing a memory location in one or more memory modules to which said first and second data processing modules have access, said memory location defining the functionality of said data processing modules.

* * * * *